UNITED STATES PATENT OFFICE.

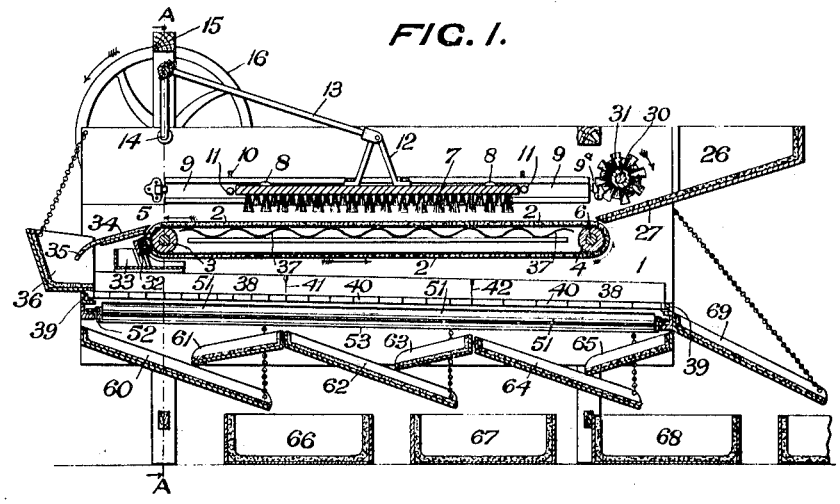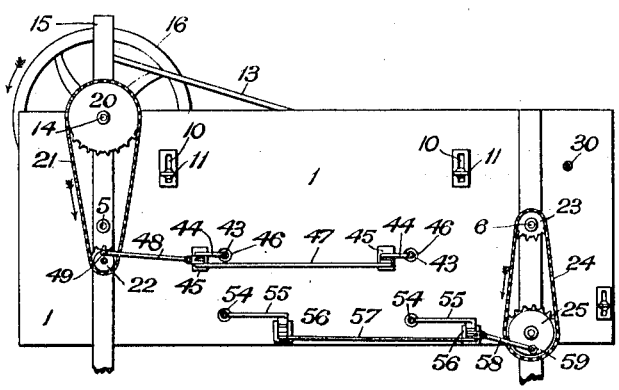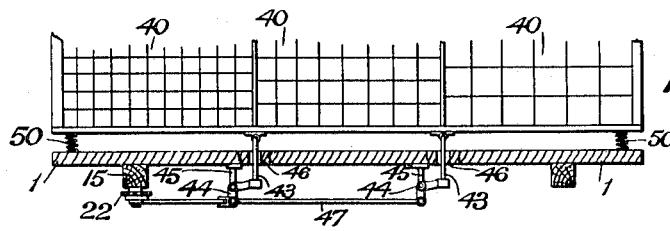

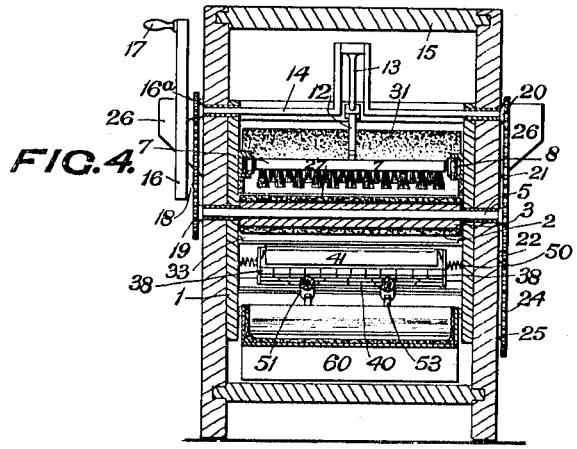
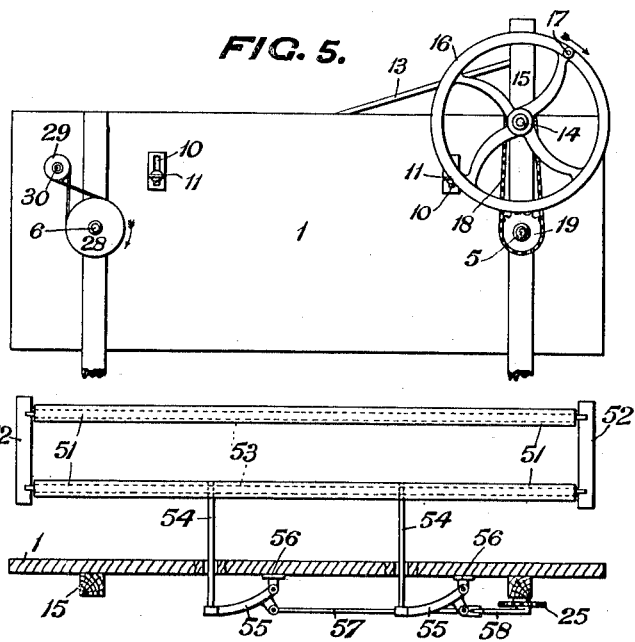
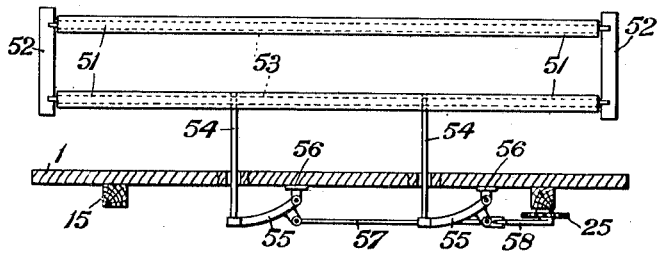

HERMANN BECKER, OF ST. SAVIOURS, ISLE OF JERSEY.

APPARATUS FOR CLEANING FRUITS, VEGETABLES, SEEDS, AND THE LIKE.

1,055,121.   Specification of Letters Patent.   Patented Mar. 4, 1913.

Application filed September 7, 1912. Serial No. 719,134.

*To all whom it may concern:*

Be it known that I, HERMANN BECKER, a subject of the King of Great Britain, residing at Five Oaks, St. Saviours, Isle of Jersey, Channel Islands, have invented certain new and useful Improvements in Apparatus for Cleaning Fruits, Vegetables, Seeds, and the Like, of which the following is a specification.

This invention relates to improvements in apparatus for cleaning fruits, vegetables, seeds and the like, and it has for its object to provide means whereby the cleaning operation may be effected in a more hygienic manner with great rapidity and at considerably less expense than heretofore.

It is usually the practice to employ hand labor for preparing for the market fruits, and vegetables, especially those which have been sprayed during growth with chemical substances which frequently attack and ruin crops, and this practice is not only tedious, but in most cases, is extremely costly.

This invention provides a mechanical substitute which operates without any danger of injury to the fruit or vegetables under treatment, and the invention has been designed with especial reference to the cleansing of tomatoes which, according to custom, are sprayed during growth with a solution of sulfate of copper and lime and which, when packed, are invariably found to be marked on the surface and not in presentable condition either for marketing or for consumption. The invention is, however, not limited in its application to tomatoes, and may be utilized to deal with any other vegetable, fruit, bulb or seed which may require cleaning preparatory to being sent to market.

According to this invention, the articles to be cleaned are fed into a trough or casing onto an endless traveling apron above which is reciprocated rapidly a brush whose bristles contact with the articles and remove all foreign matter from the surface of the same. In order that the entire surface of each article may be subjected to the cleansing action of the brush, a transversely corrugated bed is disposed beneath the upper run of the aforesaid endless apron, and the bristles of the reciprocating brush are arranged in transverse rows of alternating lengths, whereby each article during its passage from the feeding-in to the delivery-end of the apparatus is completely turned over and thus thoroughly brushed. A hopper is provided into which the fruits or vegetables are fed and whence they are delivered by means of a rotary brush which spreads them evenly across the traveling apron. The endless apron and the reciprocating brush may be actuated at the requisite speeds by manually operated gear, or if desired, mechanical or electrical driving mechanism may be employed. The reciprocating brush is preferably so arranged that the height of the brush from the endless apron may be varied in accordance with the size or delicacy of the article under treatment, and if desired, each row of bristles may be adapted to be removed independently of the remainder to facilitate renewal, or for any other purpose. The driving mechanism may be so arranged that the movement of the endless apron may be retarded or, if necessary, stopped altogether, thus delaying or arresting the passage of the articles through the machine, while the reciprocation of the brush is continued as before. The cleaned articles may be delivered from the apparatus along an inclined plane into a container therebeneath, or on to conveyer mechanism which transports the articles to a packing table. Suitable means may be provided at the delivery end of the machine whereby the cleaned articles are graded during delivery. The reciprocating brush may, if desired, be built up of a number of separable sections adapted to reciprocate as a whole. A number of such apparatus may, if desired, be connected side by side and operated from the same source of power.

A machine constructed in accordance with the invention is illustrated in the accompanying drawings, in which:

Figure 1 is a longitudinal section; Fig. 2 is a side elevation of the apparatus showing the mechanism for operating the grading tray and the clearing rollers associated with said tray; Fig. 3 is a sectional plan view of a portion of the grading apparatus; Fig. 4 is a transverse section on line A—A, Fig. 1; Fig. 5 is an elevation of the hand-wheel side of the apparatus; and Fig. 6 is a sectional plan view of the rollers for clearing the grading apparatus and of the levers for actuating the same.

1 is a trough-like casing of wood or other appropriate material, padded internally if the articles to be cleaned are of a delicate nature, and supported on a stand or base at a suitable height from the ground. Within said casing 1 a horizontally disposed endless traveling apron 2 of stout canvas, sailcloth, or other suitable material is stretched over rollers 3, 4, mounted upon shafts 5, 6, supported in bearings in the side walls of said casing, the outer surface of said endless traveling apron being provided, if desirable, with an upper layer of quilted material. Above the apron is arranged a brush 7, of rectangular shape in plan, which is mounted on rollers 8, 8, taking into horizontal grooved ways or guide-rails 9, 9, secured adjustably to the side walls of the casing 1 by means of bolts passing through vertical slots 10, 10, 10, 10, formed in said side walls and butterfly nuts 11, 11, 11, 11, taking onto said bolts. At the extremities of said grooved ways 9 resilient stops or buffers 9ª may be mounted, if necessary. The bristles of this brush 7 are soft, medium, or hard, according to the requirements of the articles to be treated by the machine. A bow 12 is bolted or otherwise secured to the upper side of said brush 7 and a connecting rod 13 links the bow 12 with a crank shaft 14 mounted in bearings in an upper frame 15 and provided with a fly wheel 16 and an operating handle 17.

On the crank shaft 14, adjacent to the fly wheel 16, is mounted a sprocket 16ª, and a chain 18 transmits the forward rotary motion of said sprocket to a second sprocket 19 keyed on the shaft 5, whereby the endless apron 2 is driven. At its opposite extremity the crank shaft 14 has keyed to it a sprocket 20 connected by a chain 21 with a sprocket 22 for a purpose to be referred to hereafter; and at one extremity of the shaft 6 sprocket 23 is keyed and is connected by a chain 24 to a sprocket 25 for a purpose also to be referred to hereafter.

26 is a suitably padded hopper attached removably to the casing 1 and into which the articles to be cleaned are fed by suitable means, an inclined padded platform 27 leading the articles from the hopper to the endless apron 2. At the end opposite that which carries the sprocket 23 the shaft 6 has keyed to it a pulley 28 from which a belt is taken to a smaller pulley 29 carried on the spindle 30 of a rotary brush 31 arranged in suitable bearings transversely of the delivery edge of the hopper 26 and serving to spread the articles uniformly before they are deposited upon the endless apron 2.

32 is a stationary brush arranged parallel with the roller 3 and bearing against the endless apron 2, said brush 32 being mounted adjustably in a removable pan 33 and serving to remove from the apron 2 particles of dirt and other extraneous matter detached by the brush 7 from the articles as they pass through the machine. A padded inclined plate 34 upon which the articles are delivered by apron 2 is arranged above said pan 33 and has a leather or other flexible extension 35 which overhangs a removably trough or tray 36 adapted to receive the cleaned articles and to pass them on to grading devices to be referred to hereafter. The leather or flexible extension 35 breaks the fall of the articles which roll down the inclined plate 34 and thus prevents ripe and soft fruit, vegetables or the like from becoming bruised as they fall into the trough or tray 36.

In order that the entire surface of each article may be subjected to the cleaning action of the brush 7, a corrugated bed 37 of iron or other suitable material is arranged beneath and closely adjacent to the upper run of the apron 2, and, as will be clearly seen in the drawings, the bristles of the brush 7 are arranged in transverse rows of alternating lengths. The effect of this arrangement is to cause each article to be turned or spun completely over several times during its passage through the machine, thus exposing the entire surface of each object to the brush. If desired, each row of bristles may be attached removably to the back of the brush 7.

Beneath the aforesaid endless apron 2 there is arranged a grading tray 38 adapted to grade the cleaned articles into, say three different sizes. This tray 38 is rectangular in shape and is mounted at its two ends on transverse guides 39, 39, upon which said tray is adapted to be agitated by being reciprocated rapidly in a lateral direction. The bottom of the tray is perforated with groups of square, circular or other conveniently shaped apertures 40 whereof the dimensions of the respective groups increase progressively toward the delivery end of the tray, and said tray is inclined downwardly toward its delivery end; the transverse guide at that end being arranged adjustably to permit regulation of the inclination of the tray.

Suitable curtains 41, 42 separate adjacent groups of grading apertures in order to retard the passage of the articles and to enable the grading of the same to be effected satisfactorily. In cases where articles of an extremely delicate or frangible nature are to be treated in the machine, a series of strands of soft material, such as chenille, may be suspended from above the tray 38 in addition to said curtains; said strands serving as cushioning devices to prevent the articles from being thrown into contact with one another and bruised or broken by the oscillation of the tray 38.

The grading tray 38 is composed of any suitable material in accordance with the nature of the articles to be treated and is somewhat narrower than the casing 1, in order to permit of lateral movement of said tray. Any desired mechanism may be employed, and in the present embodiment of the invention, the said tray is connected by rods 43, 43, coupled to bell-crank levers 44, 44, mounted pivotally upon brackets 45, 45, secured to one side of the casing 1; said rods 43, 43, passing through the apertures 46, 46, in the casing. The bell-crank levers 44, 44, are connected by a rod 47 and by a link 48 to a wrist pin 49 upon the aforesaid sprocket wheel 22 whereby the parts are actuated. Cushioning springs 50 are inserted between the side walls of the tray 38 and the interior of the casing 1. In cases where the articles under treatment are of a heavy nature and where the machine is of large capacity, the aforesaid mechanism for agitating the grading tray 38 may be duplicated on the opposite side of the machine.

In order to prevent articles of an irregular shape from choking the apertures of the grading tray 38, a pair of rollers 51, 51, are arranged in light contact with the underside of the tray and are adapted to be rotated transversely across the same. The rollers 51, 51, which are flexible longitudinally and are heavily padded with soft material, are carried by a frame consisting of end members 52, 52, and side members 53, 53, the latter being situated each immediately below a roller. The journals of the roller spindles are received in slots in the end members 52, 52, which slots contain coiled springs serving to press the rollers lightly against the underside of the grading tray over the surface of which the rollers are rotated slowly back and forth by means of rods 54, 54, each connected at one end to one of the side members 53, and at the opposite end to bell-crank levers 55, 55, mounted on brackets 56, 56, secured to the side of the machine. The bell crank levers 55, 55, are connected by a rod 57 and by a link 58 to a wrist-pin 59 carried by the aforesaid sprocket wheel 25 whereby the frame and consequently also the rollers are traveled.

Beneath each group of grading apertures 40 a pair of oppositely inclined chutes 60, 61, 62, 63, 64, and 65 is arranged to deliver the graded articles into trays or other containers 66, 67, and 68, and that end of the casing adjacent to the largest grading apertures is open and is provided with an inclined chute 69 which delivers into a receiver all those articles which are too large in size or too irregular in shape to pass through the apertures.

Instead of the crank handle 17 it will be manifest that the machine may be operated by means of a petrol, electric or other suitable motor connected appropriately thereto.

In order to adapt the machine to the cleaning of potatoes, bulbs or other objects which should preferably be examined to detect those which it is undesirable to market, the machine may be provided adjacent to the hopper 26 with a second endless apron adapted to be driven slowly to feed the objects into the machine. This second apron may advantageously be composed of wire netting of comparatively large mesh, say half an inch, and its edges are provided with means to vibrate the same to cause the objects thereon to be spread out or separated for examination by the operator; a pan being arranged below said apron for the reception of refuse or waste. When articles such as tomatoes are to be subjected to preliminary examination, this second endless apron may be composed of the same materials as the apron 2.

It will be clear from the foregoing description and from the drawings that by turning the handwheel 16 the crank shaft 14 is turned and brush 7 is reciprocated, and at the same time, the endless apron 2 is driven by the gearing 16ª, 18 and 19, and the grading tray and clearing rollers are oscillated by means of the connecting rods and levers and the gearing 20, 21 and 22, and 23, 24, 25 respectively.

The machine may be made in any size, either for domestic uses, for use on shop counters, or for commercial uses generally.

By means of the above described apparatus, tomatoes, apples, oranges, onions, gooseberries, nuts, bulbs, seeds, or potatoes, or any other fruiterer's greengrocer's, or seedman's merchandise may be thoroughly cleansed and graded and rendered fit for the market or for window display purposes, and the same machine may be converted so as to be adapted to deal with all these different articles, by interchanging the bristles, or by removing the padded linings of the various parts and replacing the same by other appropriate linings, or by exchanging the textile aprons, all as will be obvious to those skilled in the art.

Claims:

1. In a cleaning machine, the combination, with a substantially-horizontal flexible conveyer for supporting the articles under treatment, and driving means therefor; of a substantially-horizontal reciprocatory brush disposed above said conveyer in position to contact with the articles supported thereupon; means for operating said brush; and a stationary transversely-corrugated horizontal plate disposed beneath and adjacent to said conveyer and coöperative with said brush for causing the said articles to turn over in their travel with said conveyer during treatment by the brush, to expose their entire surface to the brushing action.

2. In a cleaning machine, the combination, with a substantially-horizontal flexible conveyer for supporting the articles under treatment, and driving means therefor; of a substantially-horizontal reciprocatory brush disposed above said conveyer in position to contact with the articles supported thereupon, said brush being provided with downwardly-projecting transverse rows of bristles of alternating lengths; means for operating said brush; and a stationary transversely-corrugated horizontal plate disposed beneath and adjacent to said conveyer and coöperative with said brush for causing the said articles to turn over in their travel with said conveyer during treatment by the brush, to expose their entire surface to the brushing action.

In testimony whereof I have hereunto set my hand in presence of two subscribing witnesses.

HERMANN BECKER.

Witnesses:
ERNEST JOHN HILL,
HARRY JOHN STOGDEN.